United States Patent [19]
Matsuzaki et al.

[11] Patent Number: 5,649,229
[45] Date of Patent: Jul. 15, 1997

[54] PIPELINE DATA PROCESSOR WITH ARITHMETIC/LOGIC UNIT CAPABLE OF PERFORMING DIFFERENT KINDS OF CALCULATIONS IN A PIPELINE STAGE

[75] Inventors: Toshimichi Matsuzaki, Minoh; Nobuo Higaki, Osaka; Masashi Deguchi, Nara, all of Japan

[73] Assignee: Matsushita Electric Industrial Co., Ltd., Osaka, Japan

[21] Appl. No.: 419,957

[22] Filed: Apr. 10, 1995

Related U.S. Application Data

[63] Continuation of Ser. No. 994,989, Dec. 22, 1992, abandoned.

[30] Foreign Application Priority Data

Dec. 25, 1991 [JP] Japan ................ 3-342629

[51] Int. Cl.$^6$ ........................................ G06F 13/00
[52] U.S. Cl. ............... 395/800; 395/376; 364/231.8; 364/258; 364/263.3; 364/DIG. 1
[58] Field of Search ........................ 395/800, 375; 364/231.8, 258, 263.3, DIG. 1

[56] References Cited

U.S. PATENT DOCUMENTS

| | | | |
|---|---|---|---|
| 4,041,461 | 8/1977 | Kratz et al. | 395/775 |
| 4,616,313 | 10/1986 | Aoyagi | 395/375 |
| 5,091,853 | 2/1992 | Watanabe et al. | 395/375 |
| 5,187,795 | 2/1993 | Balmforth et al. | 395/800 |
| 5,197,141 | 3/1993 | Ito | 395/425 |

OTHER PUBLICATIONS

DeRosa et al., "An Evaluation of Branch Architectures", IEEE Computer Architecture, 1987, pp. 10–16.

McFarling et al., "Reducing the Cost of Branches", IEEE 13th International Symposium on Computer Architecture, 1986, pp. 396–403.

Primary Examiner—Larry D. Donaghue
Assistant Examiner—John Harrity
Attorney, Agent, or Firm—McDermott, Will & Emery

[57] ABSTRACT

The data processors of the present invention transfer the contents of address registers and program registers through an unused bus during the cycle of writing into registers and execute, in one cycle, a load instruction or a store instruction that requires address calculation, although the processors have two buses and one arithmetic/logic unit. Also, the data processors assign basic arithmetic instructions between registers and load/store instructions instruction codes having a basic instruction word length of one byte by functionally dividing general purpose-registers into four address registers and four data registers.

5 Claims, 12 Drawing Sheets

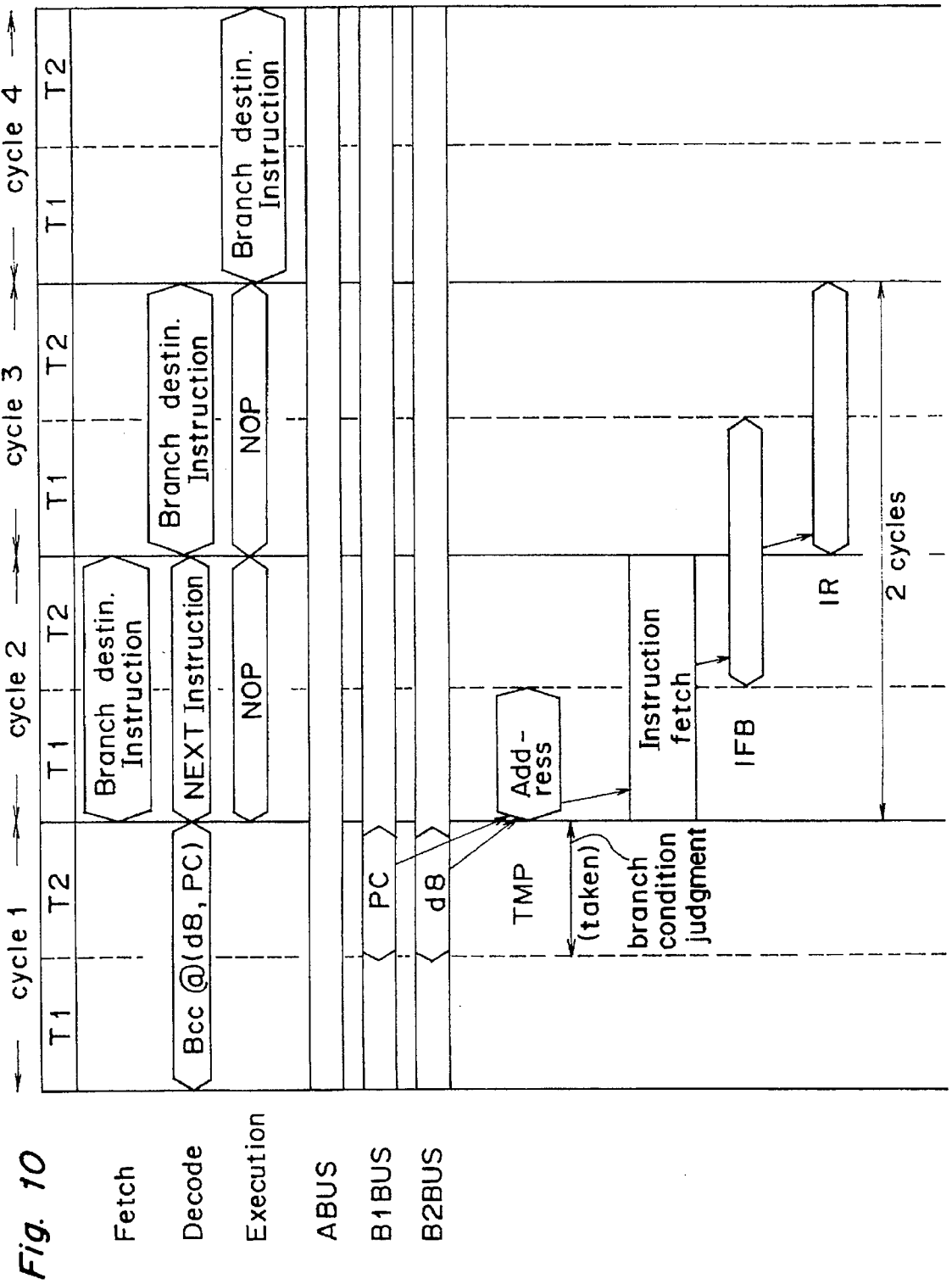

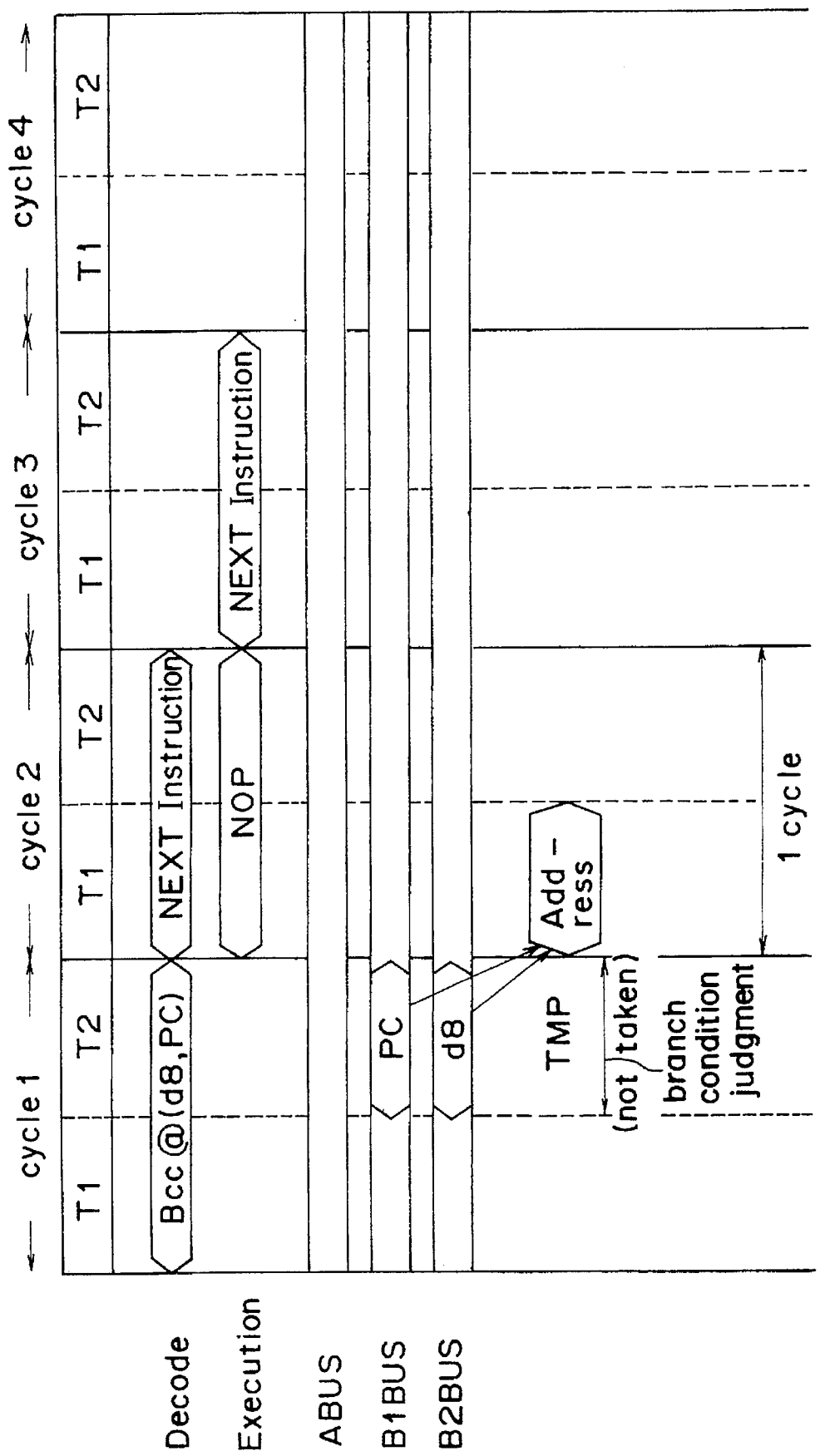

Fig.12

| Instruction code | Size | Instruction |
|---|---|---|
| 0000 0*An | 1 | INC An      DEC An |
| 0000 1*Dn | 1 | INC Dn      DEC Dn |
| 0001 0*An | 1 | INC2 An     DEC2 An |
| 0001 10An | 3 | MOVI #imm16,An |
| 0001 11Dn | 3 | MOVI #imm16,Dn |
| 0001 0*Dn | 2 | AND #imm8,Dn      OR #imm8,Dn |
| 0010 10Dn | 2 | BTST #imm8,Dn |
| 0010 11Dn | 2 | ADD #imm8,Dn |
| 0011 00Dn | 3 | LDB @abs16,Dn |
| 0011 01An | 2 | ADD #imm8,An |
| 0011 10Dn | 3 | LD @abs16,Dn |
| 0011 11Dn | 3 | LDBU @abs16,Dn |
| 010* DnDn | 1 | AND Dn,Dn       SUB Dn,Dn |
| 011* DnDn | 1 | CMP Dn,Dn       MOV Dn,Dn |
| 1000 AnDn | 1 | [ST Dn,@An] |
| 1001 AnDn | 1 | [STB Dn,@An] |
| 1010 AnDn | 2 | [ST Dn,@(d8,An)] |
| 1011 00CC | 2 | [BLT    BGT    BGE    BLE] |
| 1011 01CC | 2 | [BCS    BHI    BCC    BLS] |
| 1011 10Dn | 3 | ST Dn,@abs16 |
| 1011 11Dn | 3 | STB Dn,@abs16 |
| 1100 AnDn | 1 | [LD @An,Dn] |
| 1101 AnDn | 1 | [LDBU @An,Dn] |
| 1110 AnDn | 2 | [LD @(d8,An),Dn] |
| 1111 00.. | - | Code extention |
| 1111 0110 | 1 | RTI |
| 1111 0111 | - | Code extention |
| 1111 100C | 2 | [BEQ,BNE] |
| 1111 1010 | 2 | JSR @abs16 |
| 1111 1011 | 3 | JMP @abs16 |
| 1111 1100 | 3 | [JMP @(d8,PC)] |
| 1111 1101 | 1 | NOP |
| 1111 1110 | 1 | RTS |
| 1111 1111 | 1 | PI |

Fig. 13

| Instruction code | Size | Instruction |
|---|---|---|
| 00Dm AnDn | 2 | [ST Dn, @(Dm,An)] |
| 01Dm AnDn | 2 | [LD @(Dm,An),Dn] |
| 10Dm Anan | 2 | [ST an, @(Dm,An)] |
| 11Dm Anan | 2 | [LD @(Dm,An),an] |

PIPELINE DATA PROCESSOR WITH ARITHMETIC/LOGIC UNIT CAPABLE OF PERFORMING DIFFERENT KINDS OF CALCULATIONS IN A PIPELINE STAGE

This is a continuation application of application Ser. No. 07/994,989 filed Dec. 22, 1992 now abandoned.

BACKGROUND OF THE INVENTION

1. Field of the Invention

The present invention relates to data processors that perform pipeline processing by means of internal bus organizations that provide miniaturization of processors and high-speed operation and to data processors that have instruction codes that provide miniaturization of programs.

2. Description of the Related Art

Existing data processors are organized in such a way that the internal arithmetic/logic unit is connected to registers for retaining data through two or more internal buses in order to reduce operation time. In a data processor having two internal buses, an operation between two registers is performed using two machine cycles. During the first cycle the contents of the registers are read into the two buses and input into the arithmetic/logic unit. During the second cycle the result of the operation performed by the arithmetic/logic unit is output into either one of the two buses and written into a register.

In a data processor having three internal buses, an operation between two registers can be performed in one machine cycle. During the first cycle the contents of the registers are read into the first and second buses and input into the arithmetic/logic unit. The result of the operation is output into the third bus during the second cycle. The first and second buses are related to the third bus as a pipeline system. While the result of the operation is output into the third bus, the data for the next operation are output into the first and second buses. Therefore, in a data processor having three buses, one operation between two registers can be performed in one machine cycle.

While data processors having three internal buses make high-speed operation possible, each register has to be connected to the arithmetic-logic unit through three internal buses, and the hardware tends to expand. Therefore, data processors having three internal buses are not fit to be built into low-cost oriented equipment. On the other hand, while existing data processors having two internal buses downsize the hardware, an operations between registers or a data transfer between a register and the memory is hard to be performed in one machine cycle.

Some of prior data processors limit the objects of operations to data storage memory. In this type of data processors, an operation is performed following an instruction composed of one operation code and two operand addresses.

Some of prior data processors have a special register called accumulator and other registers, and the objects of main operations include the accumulator. In this type of data processors, an operation is performed following an instruction composed of one operation code and one operand code designating a memory address or a register other than the accumulator.

There are also data processors having general-purpose registers such that any pair of them can be the objects of several operations, and an instruction is composed of an operation code and two operand codes designating two registers.

However, in the above data processors having the memory as the sole objects of operations, an instruction word length becomes large, since an instruction requires two operand address fields. Therefore, the size of a program written for this type of data processors is generally large.

In the above data processors having an accumulator, an instruction word length is small, since an instruction has only one operand address. However, the data transfers between the accumulator and other registers or the memory are frequently required, since the objects of main operations include the accumulator. As a result, a program size is generally large, and the processing speed for executing a program tends to be slow.

On the other hand, in data processors having general-purpose registers, the number of instructions in a program can be reduced, since any pair of general-purpose registers can be the objects of operations. Also, an instruction word length is comparatively small, since the operand of an instruction is register-designating codes, which are shorter than for memory addresses. However, the instruction word length of an operation between two registers can not be made smaller than in data processors having an accumulator for the following reason.

For example, if a data processor has 8 general-purpose registers, then the code designating one register requires at least three bits, and the instruction for an operation between two registers requires 6-bit register fields. If, in this case, the instruction word length is 8 bits, then the remaining two bits facilitate only four kinds of instructions, which are less than required. Therefore, in practice, an instruction word length is made 16 bits. Therefore, it is hard for data processors having general-purpose registers to perform a number of different kinds of operations by means of instructions having a small word length.

SUMMARY OF THE INVENTION

The object of the present invention is therefore to provide a data processor that calculates addresses at high speed by means of low cost hardware having two internal buses and one arithmetic/logic unit and improves performance in executing memory access instructions and jump instructions and the like.

The present invention is also aimed at providing a data processor that has 8 registers and still realizes basic arithmetic/logic instructions between registers and load/store instructions by 8-bit instruction codes.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals and in which:

FIG. 10 shows a timing chart for a conditional jump instruction being executed when the condition is satisfied in the data processor of the first embodiment according to the present invention.

FIG. 11 shows a timing chart for a conditional jump instruction being executed when the condition is not satisfied in the data processor of the first embodiment according to the present invention.

FIG. 12 shows code assignment to the instructions having a basic instruction word length for the data processor of the first embodiment according to the present invention.

FIG. 13 shows code assignment to the transfer instructions in the indexed-addressing mode for the data processor of the first embodiment according to the present invention.

DETAILED DESCRIPTION OF THE PREFERRED EMBODIMENTS

The preferred embodiments according to the present invention will be described below with reference to the attached drawings.

Figure 1:
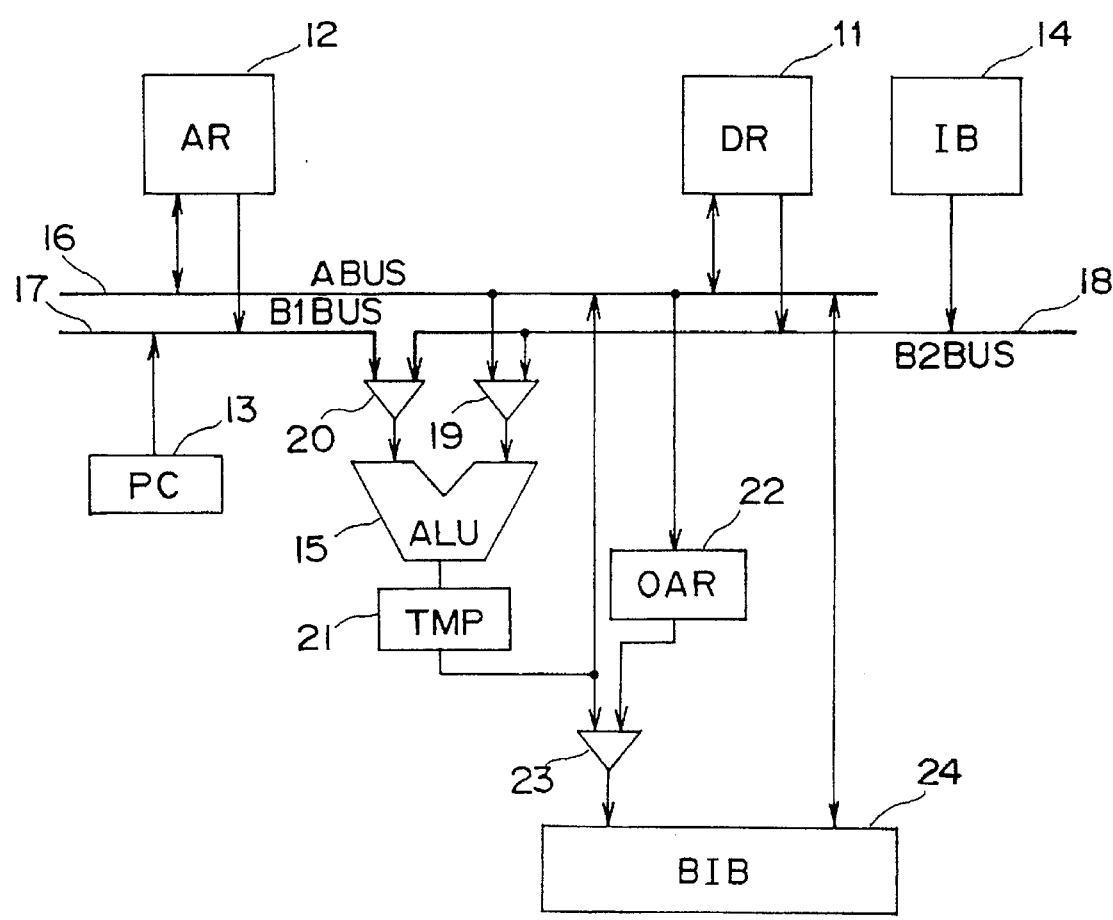
FIG. 1 shows an internal block diagram of the data processor of the first embodiment according to the present invention.

FIG. 1 shows an internal block diagram of the data processor of the first embodiment according to the present invention. In FIG. 1, reference numeral 11 denotes a data register used for the retention and calculation of data and consists of four 16-bit registers. Reference numeral 12 denotes an address register used for the retention and calculation of addresses and consists of four 16-bit registers. Reference numeral 13 denotes a 16-bit program counter and retains the address of an instruction being executed. Reference numeral 14 denotes an instruction buffer that stores an instruction read from the memory before its execution. Reference numeral 15 denotes an arithmetic/logic unit that calculates 16-bit data and addresses. 16 denotes an address bus that is connected to the data registers 11 and address registers 12 and transfers data between one of the registers and arithmetic/logic unit 15. 17 denotes a bus that transfers data read from the address register 12 and program counter 13. 18 denotes a bus that transfers data read from the data register 11 and instruction buffer 14. 19 denotes a selector that selects data from between the contents of the bus 16 and the bus 18 and feeds the data to the arithmetic/logic unit 15. 20 denotes a selector that selects data from between the contents of the bus 17 and the bus 18 and feeds the data to the arithmetic/logic unit 15. 21 denotes a temporary register that temporarily retains calculated results from the arithmetic/logic unit 15. 22 denotes an operand address register that retains an address for accessing the memory. 23 denotes a selector that selects data from between the contents of the temporary register 21 and operand address register 22. 24 denotes a bus controller that accesses a memory address selected by the selector 23.

Figure 2:
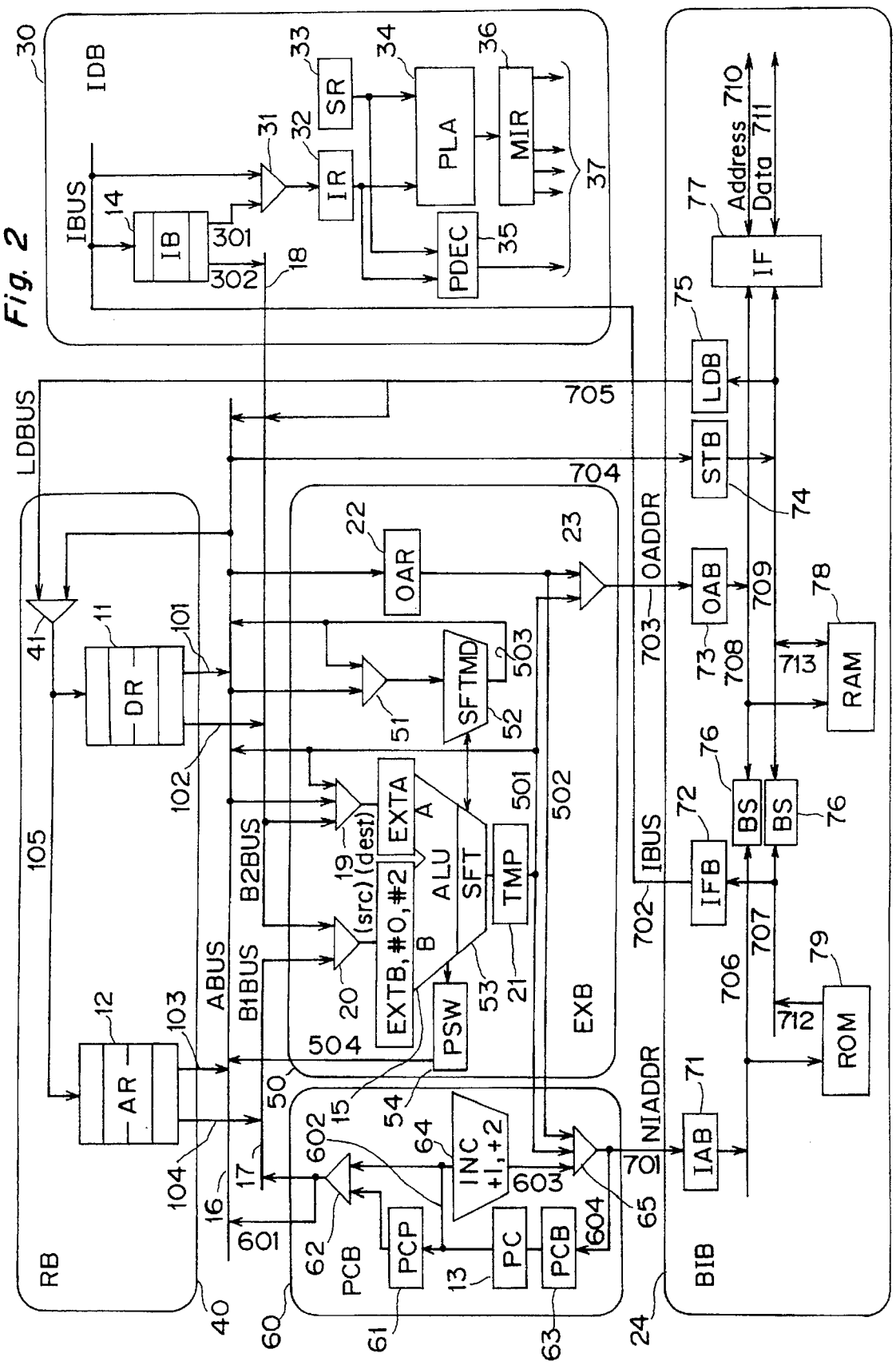
FIG. 2 shows a detailed internal block diagram of the data processor of the first embodiment according to the present invention.

FIG. 2 shows a detailed internal block diagram of the data processor of the first embodiment according to the present invention. In FIG. 2, a component having the same number as a component in FIG. 1 designates the same component as in FIG. 1. 30 denotes an instruction decode block and contains the instruction buffer 14. 40 denotes a register block and contains the data register 11 and address register 12. 50 denotes an execution block and contains the arithmetic/logic unit 15, temporary register 21, selector 20, selector 19, operand address register 22, and selector 23. 60 denotes a program counter block and contains the program counter 13.

Figure 3:
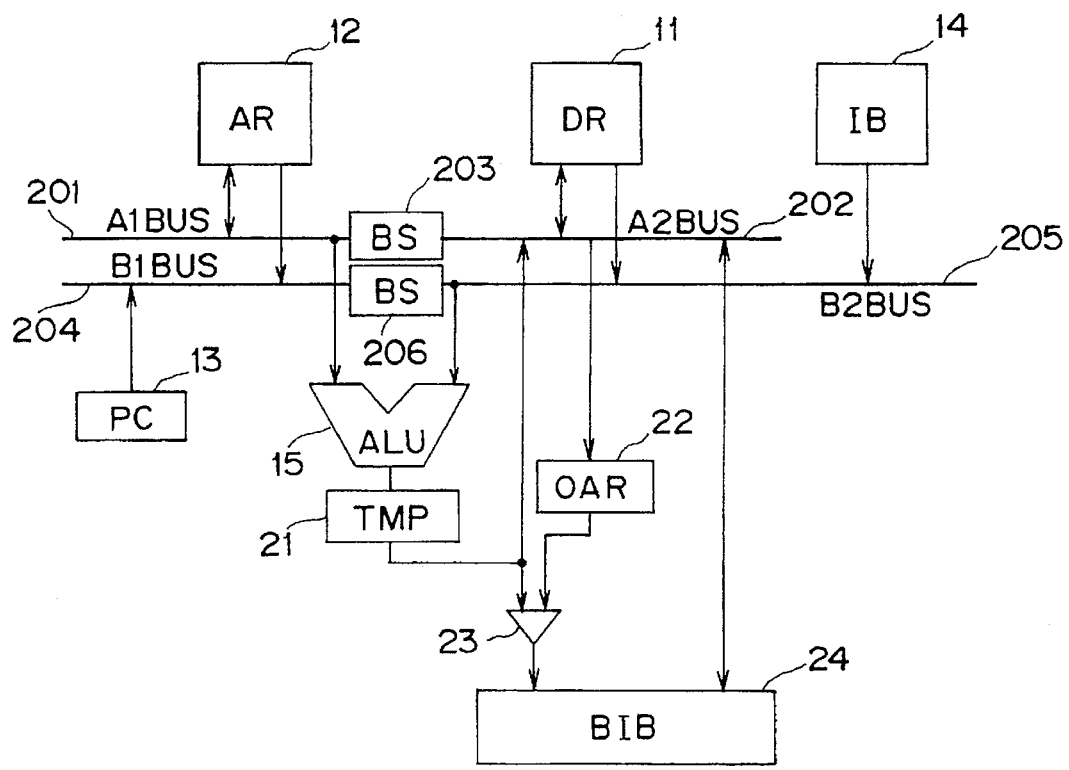
FIG. 3 shows an internal block diagram of the data processor of the second embodiment according to the present invention.

FIG. 3 shows an internal block diagram of the data processor of the second embodiment according to the present invention. A component having the same number as a component in FIG. 1, such as registers, is the same component as in FIG. 1. 201 and 202 denote buses connected to the address register 12 and data register 11, respectively, and transfer data read from and written into the registers. 203 denotes a bus switch that controls the connection and disconnection between the bus 201 and the bus 202. 204 and 205 denote buses connected to the address register 12 and data register 11, respectively, and transfer data read from the registers. 206 denotes a bus switch that controls the connection and disconnection between the bus 204 and the bus 205. If one of these bus switches is closed, then the buses connected to its either side work as one bus, and if the bus switch is opened, then the buses connected to its either side work as distinct buses.

Figure 4:
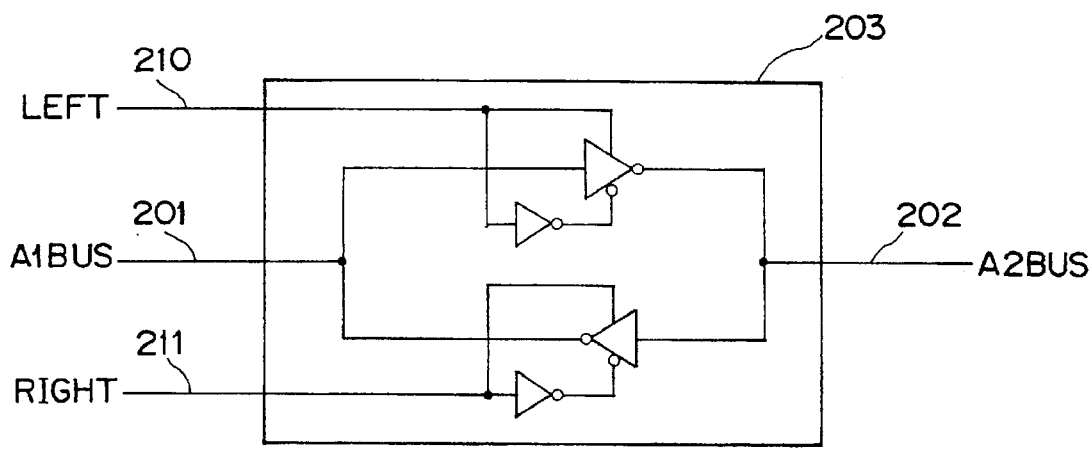
FIG. 4 shows a detailed block diagram of a bus switch of the second embodiment.

FIG. 4 shows a detailed block diagram of the bus switch 203 of FIG. 3. The bus switch 203 consists of a tri-state buffer that outputs the contents of the bus 201 into the bus 202 and a tri-state buffer that outputs the contents of the bus 202 into the bus 201, and the operation of each buffer is controlled by a control signal 210 and a control signal 211. If the control signal 210 is active, and the control signal 211 is non-active, then the contents of the bus 201 are output into the bus 202. Conversely, if the control signal 210 is inactive, and the control signal 211 is active, then the contents of the bus 202 are output into the bus 201. If both control signals are inactive, then the contents of the bus 201 and the contents of the bus 202 become different.

Figure 5:
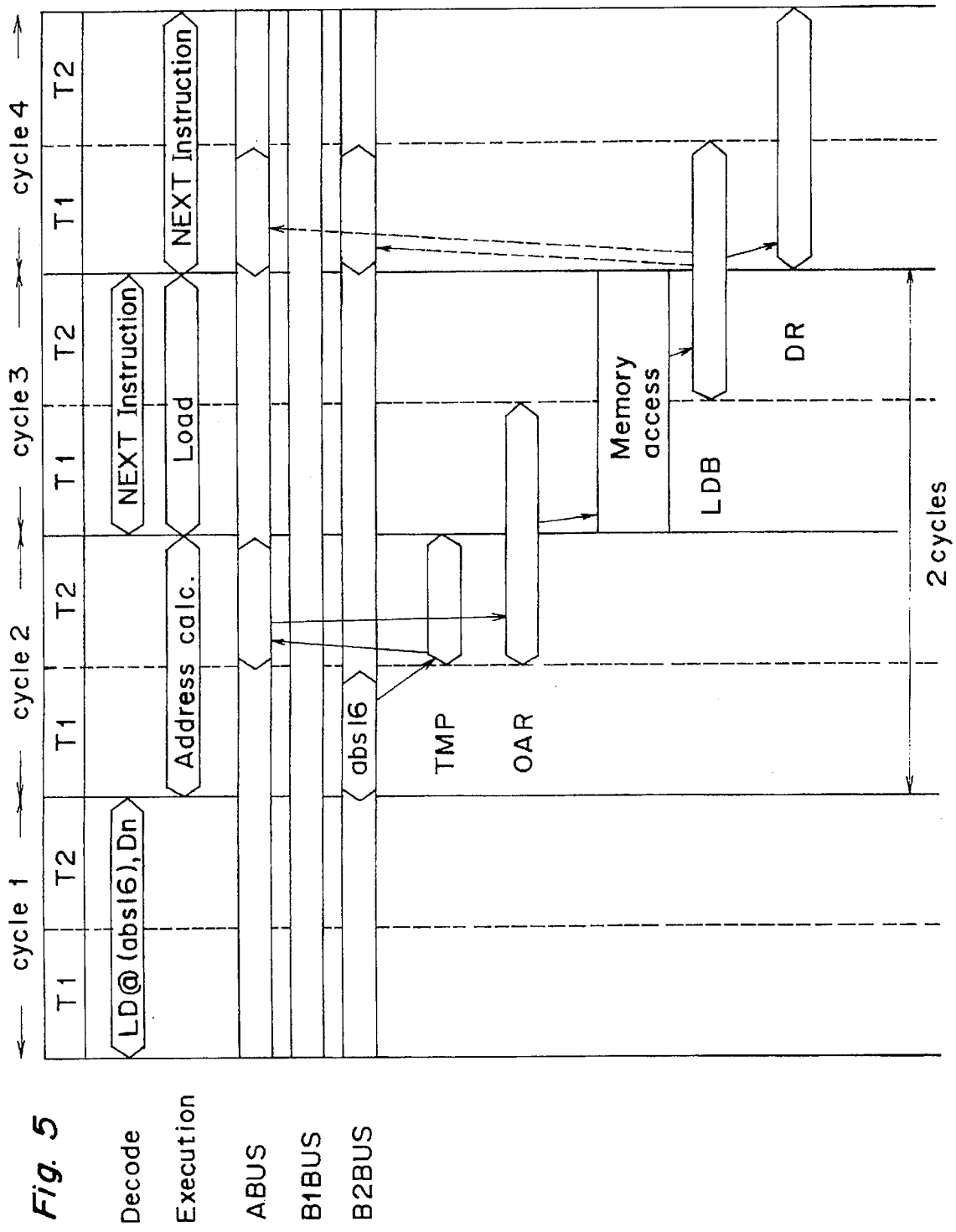
FIG. 5 shows a timing chart for a load instruction executed in two machine cycles in the data processor of the first embodiment according to the present invention.
Figure 6:
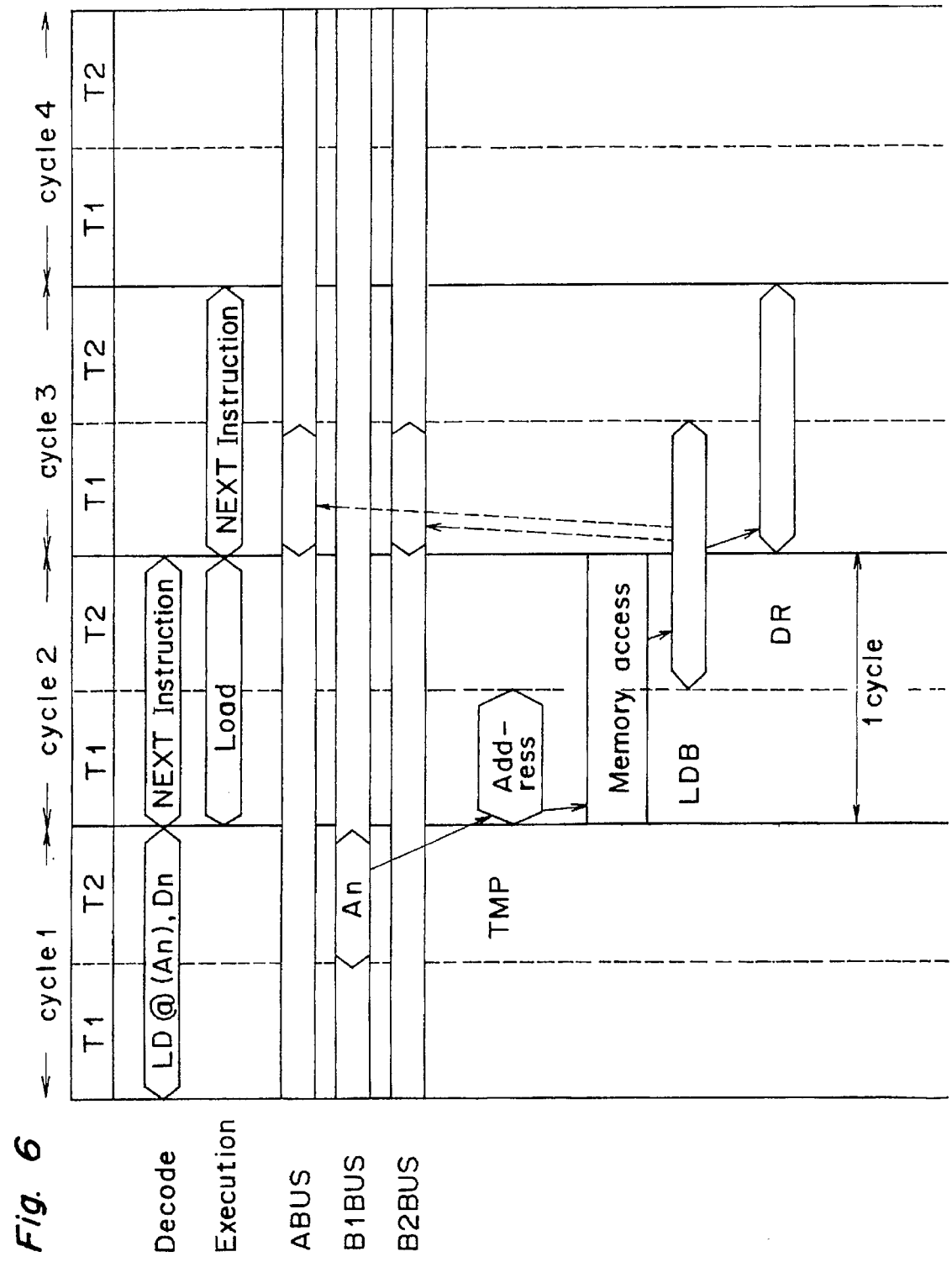
FIG. 6 shows a timing chart for a load instruction in the register-indirect-addressing mode executed in one machine cycle in the data processor of the first embodiment according to the present invention.

FIGS. 5 and 6 show a timing chart for a load instruction executed in the data processor of the first embodiment according to the present invention. In FIGS. 5 and 6, T1 and T2 are the internal clock periods. The two clock periods T1 and T2 make up one machine cycle. Decode and Execute show the states of the pipeline during the decode phase and during the execute phase respectively. The addressing of the load instruction in FIG. 5 is 16-bit absolute addressing so that the data stored in the memory location of the 16-bit address (abs16) contained in the load instruction is loaded into the data register (Dn) of the data register 11. The addressing of the load instruction in FIG. 6 is register-indirect addressing so that the data stored in the memory location shown by the contents of the address register (An) of the address register 12 is loaded into the data register (Dn).

In the following is described the operations of load instructions with reference to FIGS. 2, 5, and 6. Load instructions are usually executed in two cycles. The address from which the data is loaded is calculated during the first cycle, and the memory location of the address is accessed during the second cycle.

FIG. 5 shows a timing chart for a load instruction executed in two cycles. During the clock period T1 of cycle 1 the load instruction is read into signal lines 301 from instruction buffer 14 and stored in the instruction register 32 through the selector 31. The contents of the instruction register 32 and the contents of the status register 33, which retains the state of decoding, are input into the programmable logic array 34, which decodes the instruction. During the clock period T2 of cycle 1 the decoded results are stored in the micro instruction register 36, which outputs control signals 37. The contents of the instruction register 32 and the contents of the status register 33 are input into the predecoder 35, which outputs a control signal during the clock period T1 of cycle 1. The control signal output from the predecoder 35 is used for the execution of load instructions and conditional jump instructions described later.

In cycle 2, the value of a 16-bit absolute address is read from the buffer 14 and output into B2 bus 18 through signal lines 302 during the clock period T1. The value read into the bus 18 is selected by the selector 20 and fed to the B side of the arithmetic/logic unit 15. The input data into the B side of 15 passes through 15 and the shifter 53 intact and is stored in the temporary register 21. In this way, the address calculation in the arithmetic/logic unit 15 outputs the input data into its B side without change and not affected by the input data into its A side. The shifter 53, which is located directly following the unit 15, also outputs the input data as it is. During the clock period T2 of cycle 2 the contents of the temporary register 21 are output into the bus 16 through signal lines 501 and stored in the operand address register 22.

In cycle 3, the address stored in the operand address register 22 is selected by the selector 23 and transferred to the operand address buffer 73. The bus controller 24 decodes the address stored in the operand address buffer 73 and determines whether the address to be accessed is in ROM 79, in RAM 78 or in a memory outside the chip. The bus controller 24 then controls the bus switch 76 and external bus interface 77 based on the determined result and loads data. If the address to be accessed is in ROM 79, then the address stored in the operand address buffer 73 is fed to ROM 79 through the buses 708 and 706, and the data to be loaded is stored in the load buffer 75 through the buses 707 and 709. If the address to be accessed is in RAM 78, then the address stored in the operand address buffer 73 is fed to RAM 78 through the bus 708, and the data to be loaded is stored in the load buffer 75 through the bus 709. If the address to be accessed is in the memory outside the chip, then the address stored in the operand address buffer 73 is fed to the memory outside the chip through the buses 708 and 710, and the data to be loaded is stored in the load buffer 75 through the buses 711 and 709. In any one of these cases, if the memory does not require waiting time, then the data to be loaded is stored during the clock period T2 of cycle 3.

During the clock period T1 of cycle 4 the data stored in the load buffer 75 is transferred to the data register (Dn) through the bus 705 and selector 41. If the next instruction following the load instruction uses the loaded data by the load instruction, then the data stored in the load buffer 75 is used. In other words, during the clock period T1 of cycle 4 the data stored in the load buffer 75 is output into A bus 16 or $B_2$ bus 18 through bus 705. Therefore, the load instruction is executed in 2 cycles.

Figure 7:
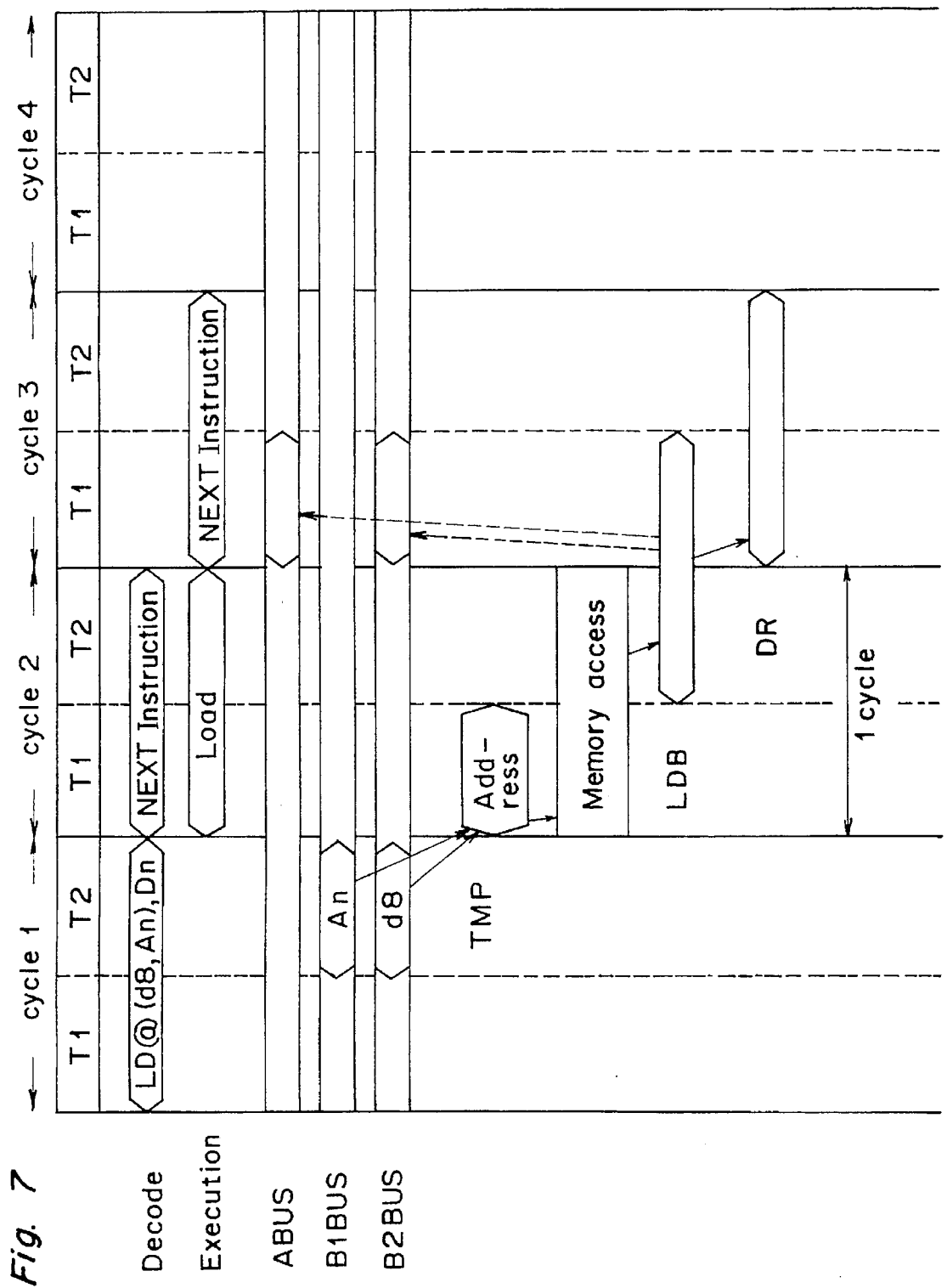
FIG. 7 shows a timing chart for a load instruction in the register-relative-indirect-addressing mode executed in one machine cycle in the data processor of the first embodiment according to the present invention.

FIGS. 6 and 7 show a timing chart for a load instruction executed in one cycle.

FIG. 6 shows a timing chart of a load instruction in the register-indirect-addressing mode. During the clock period T1 of cycle 1 the load instruction is read into the signal lines 301 from the instruction buffer 14 and stored in the instruction register 32 through the selector 31. The contents of the instruction register 32 and the contents of the status register 33, which retains the state of decoding, are input into the programmable logic array 34, which decodes the instruction. During the clock period T2 of cycle 1 the decoded results are stored in the micro instruction register 36, which outputs control signals 37. The contents of the instruction register 32 and the contents of the status register 33 are input into the predecoder 35, which outputs a control signal during the clock period T1 of cycle 1. By the control signal output from the predecoder 35, the contents of the address register (An) is read into B1 bus 17 during the clock period T2 and input into the B side of the arithmetic/logic unit 15 through the selector 20. As during the clock period T1 of cycle 2 of FIG. 5, the arithmetic/logic unit outputs the contents input into its B side without change. As a result, the contents of the address register (An) is stored in the temporary register 21 during the clock period T2 of cycle 1.

The address stored in the temporary register 21 is selected by the selector 23 and stored in the operand address register 73 during the clock period T1 of cycle 2. The memory location of the address stored in the operand address register 73 is accessed as in cycle 3 of FIG. 5, and the data to be loaded is stored in the load buffer 75. The remaining part is the same as in FIG. 5.

FIG. 7 shows a timing chart for a load instruction in the register-relative-indirect-addressing mode. The operation of the load instruction in FIG. 7 differs from that in FIG. 6 in the following two points. First, during the clock period T2 of cycle 1 the displacement is read into B2 bus 18 through the signal line 302 from the instruction buffer 14 and fed to the A side of the arithmetic/logic unit through the selector 19. Second, during the clock period T2 of cycle 1 the arithmetic/logic unit 15 calculates the memory address to be accessed by adding the input data into its A side and the input data into its B side. The other part is the same as in FIG. 6.

Figure 8:
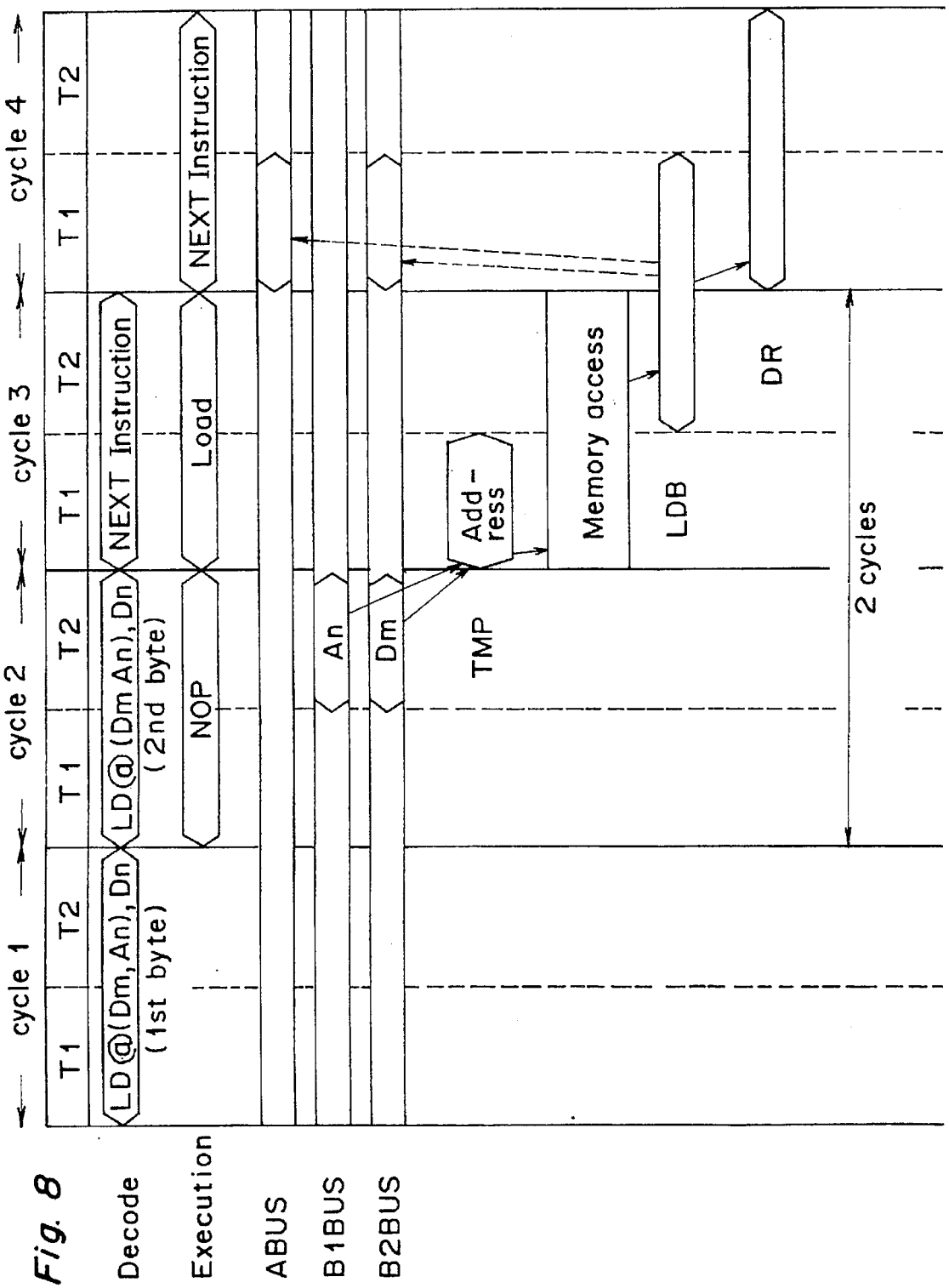
FIG. 8 shows a timing chart for a load instruction in the indexed-addressing mode executed in two machine cycles in the data processor of the first embodiment according to the present invention.

FIG. 8 shows a timing chart for a load instruction in the indexed-addressing mode. A load instruction in the indexed-addressing mode consists of two bytes and is executed in two cycles. During cycle 1 the first byte of the instruction is read from the instruction buffer 14 and decoded by the programmable logic array 34. The decoded results are stored in the micro instruction register 36. If the decoded results show that the instruction is completed with the second byte, then, during the second cycle, the next byte is read from the instruction buffer 14 and stored in the instruction register 32. The arithmetic/logic unit operates nothing during the execute phase of cycle 2.

During the clock period T1 of cycle 2 the predecoder 35 decodes the addressing mode of the instruction as the indexed-addressing mode and outputs a control signal that shows the address register (An) for the base address, the data register (Dm) for indexing and a control signal for address calculation in the arithmetic/logic unit. During the clock period T2 of cycle 2, the contents of the address register (An) are output into B1 bus 17, and the contents of the data register (Dm) are output into B2 bus 18. The selector 20 selects the contents of B1 bus 17 and inputs them into the B side of the arithmetic/logic unit 15. The selector 19 selects the contents of B2 bus 18 and inputs them into the A side of the arithmetic/logic unit 15. The arithmetic/logic unit 15 calculates the memory address to be accessed by adding the data input into these two sides. The calculated address is stored in the temporary register 21 through the shifter 53. The remaining part from cycle 3 to cycle 4 is the same as the part from cycle 2 to cycle 3 in FIG. 6.

Figure 9:
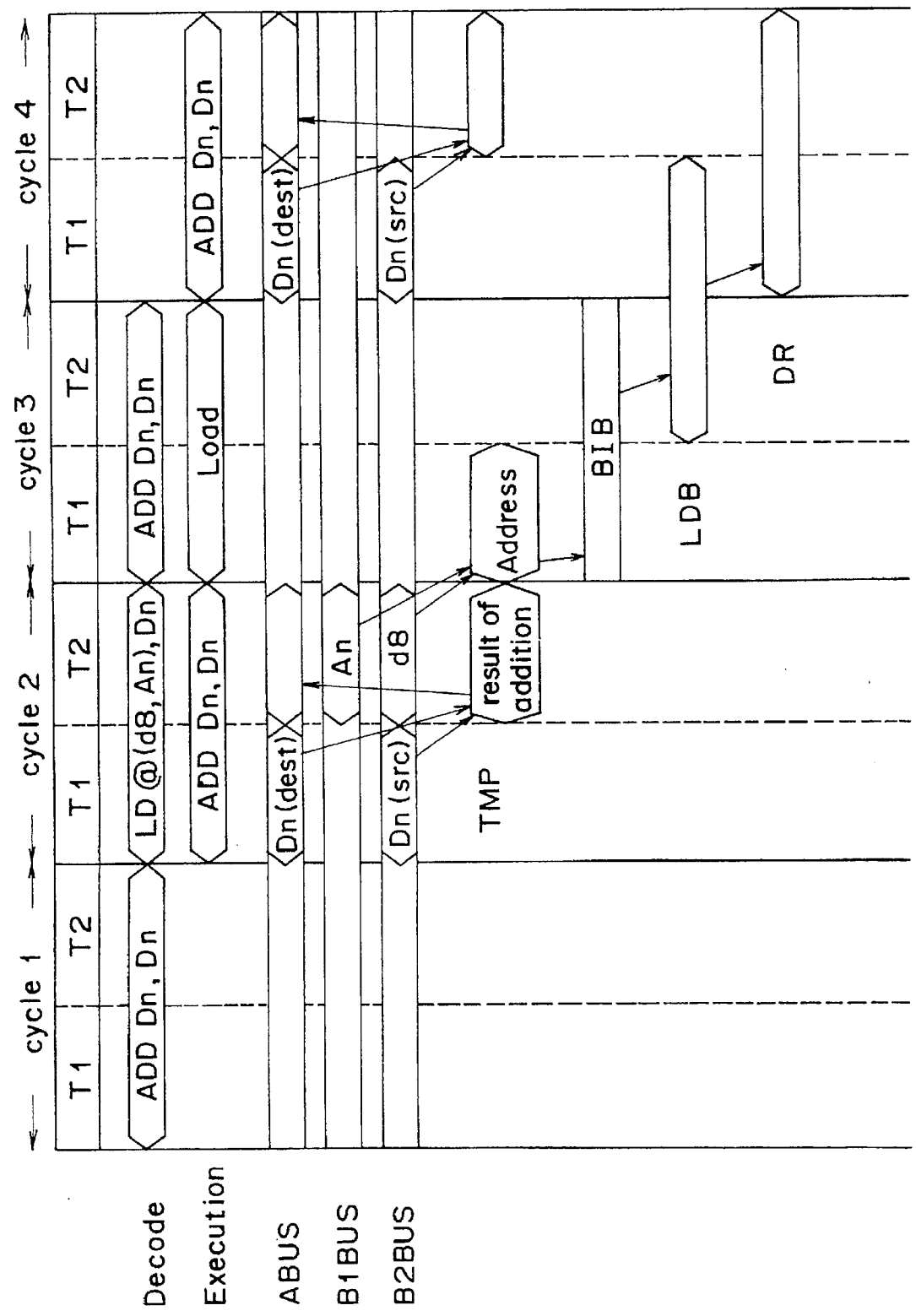
FIG. 9 shows a timing chart for the repeated execution of an arithmetic/logic instruction between registers followed by a load instruction executed in one cycle in the data processor of the first embodiment according to the present invention.

FIG. 9 shows a timing chart for an addition instruction (ADD Dn,Dn) between two registers followed by a load instruction (LD @(d8,An),Dn) being repeatedly executed. During the clock period T1 of cycle 2 the data of the source register and the destination register of the data register 11 of the addition instruction are read into B2 bus 18 and A bus 16, respectively. The data in B2 bus 18 and A bus 16 are selected by the selectors 20 and 19 respectively and input into arithmetic/logic unit 15. The arithmetic logic unit 15 then executes the addition of the data in B2 bus and the data in A bust during the same clock period $T_1$ of cycle 2. During the clock period T2 of cycle 2 the calculated result is stored in the temporary register 21 and also output into A bus 16 and written into the destination register. During the same clock period T2, the contents of the address register of the load instruction are read into B1 bus 17, and the displacement in the instruction buffer 14 is read into B2 bus 18. Then, also during the same clock period T2 of cycle 2, the arithmetic logic unit 15 executes the address calculation of the command [Ld @(d8, An), Dn].

During cycle 3 data is loaded from the memory address calculated during the clock period T2 of cycle 2 and stored in the load buffer 75. The addition instruction decoded during cycle 3 is executed in cycle 4 as in cycle 2. The data loaded during cycle 3 is stored in the data registers 11 during the clock period T1 of cycle 4. In this way, the addition instruction followed by the load instruction is repeated.

FIG. 10 shows a timing chart for a conditional jump instruction being executed when the condition is satisfied. During cycle 1 the conditional jump instruction is read from the instruction buffer 14 and stored in the instruction register 32 through the selector 31. During the clock period T1 of cycle 1 the predecoder 35 decodes the conditional jump instruction and outputs a control signal. During the clock period T2, the contents of program counter 13 are output into B1 bus 17, the displacement of the conditional jump instruction is output into B2 bus 18 from the instruction buffer 14, and the arithmetic/logic unit 15 calculates the branching-to address and outputs a control signal for determining whether the condition is satisfied or not. The present case assumes that the condition is satisfied.

During the clock period T1 of cycle 2 the address calculated by the arithmetic/logic unit is selected by the selector 65 and stored in the instruction address buffer 71. The bus controller 24 fetches the instruction stored in the memory address which is stored in the instruction address buffer 71 and stores it in the instruction fetch buffer 72 during the clock period T2. During cycle 2 the instruction decode block 30 also transfers the instruction located next to the conditional jump instruction from the instruction buffer 14 to the instruction register 32 and decodes it.

During cycle 3 the instruction decode block 30 takes the instruction stored in the instruction fetch buffer 72 in the instruction register 32 and decodes it. The results decoded during cycle 2 are canceled, because the condition of the conditional jump instruction is satisfied. In fact, when the decoded results are output from the micro instruction register 36, the decoded results are altered into a command that makes the arithmetic/logic unit and the like non-operative before being output.

During cycle 4 the instruction in the memory location of the branching-to address is executed. Therefore, if the condition is satisfied, then the conditional jump instruction is executed in two cycles.

FIG. 11 shows a timing chart for a conditional jump instruction being executed when the condition is not satisfied. The operation during cycle 1 is the same as in FIG. 10, except that the control signal for determining whether the condition is satisfied or not is different. In the present case the condition is not satisfied.

During the clock period T1 of cycle 2, the address output from the incrementer 64 is selected by the selector 65 and stored in the instruction address buffer 71. The bus controller 24 fetches the instruction stored in the memory address which is stored in the instruction address buffer 71 and stores it in the instruction fetch buffer 72 during the clock period T2. During cycle 2 the instruction decode block 30 also transfers the instruction located next to the conditional jump instruction from the instruction buffer 14 to the instruction register 32 and decodes it.

During cycle 3, the results decoded during cycle 2 are output as control signals 37 during the clock period T1. Since the condition of the conditional jump instruction is not satisfied in the present case, the contents of the micro instruction register 36 are output as they are.

Therefore, the conditional jump instruction is executed in one cycle, if the condition is not satisfied.

FIG. 12 shows the codes and sizes (numbers of bytes) of the instructions having a basic instruction word length for the data processors according to the present invention. In the instruction code column of FIG. 12 Dn denotes the number of a data register, and An denotes the number of an address register. The symbol * takes either the value 0 or 1 and respectively corresponds to the left side instruction and the right side instruction of the instruction column. CC and C express conditions of conditional jump instructions, take values 00, 01, 10, 11, and 0, 1 respectively, and correspond to the instructions in these orders in the instruction column. The instructions enclosed in brackets in the instruction column are those described in FIGS. 6, 7, 10 and 11. #imm8 and #imm16 show immediate value data, and #imm8 can be extended to 16 bits depending on the instruction. [Code extension] shows the codes that indicate that the first byte of an instruction code is completed by the second byte, if one byte is not sufficient to assign an instruction code to that instruction. FIG. 13 shows the instruction codes of load instructions as described in FIG. 8. The instruction codes of transfer instructions in the indexed-addressing mode such as a load instruction shown in FIG. 8 consist of two bytes, the first byte being the code extension 11110001 and the second byte being shown in the instruction code column of FIG. 13.

As recognized in the examples described above, the present invention takes advantage of the fact that only one bus is used in a data processor having two buses, when a result calculated by the arithmetic/logic unit is written into a register. During the same clock period the data processors of the present invention transfer data necessary for calculating the address for load and store instructions. When incorporated in an LSI, B1 bus 17 and B2 bus 18 can be arranged in one straight line, and the hardware costs for the two buses are the same as for one bus. Therefore, the vertically one bus functions as two buses during the clock period T2.

Also, as was not described in figures, jump instructions such as JMP @(d8,PC) can be executed at high speed as load instructions executed in one cycle by calculating the branching-to address during the same clock period as when data is written into a register by the immediately preceding instruction.

As described so far, the data processor of the present invention, using a machine cycle when data is written into a register, transfers the contents of an address register or the program counter. The processors are a two-bus system and have one arithmetic/logic unit but can execute a load instruction or a store instruction or the like in one machine cycle and are low-cost high-performance data processors. Also, the present invention divides general-purpose registers into four address registers and four data registers and provides a minimal register set necessary for effectively executing a program written in a sophisticated program language such as C. The present invention assigns instruction codes having a basic instruction word length of one byte to basic arithmetic/logic instructions between registers and load/store instructions and provides a great reduction of instruction codes.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pipelined data processor comprising:

a data register for retaining data to be processed, which outputs retained data at a rate of two times per one pipeline cycle, an address register for retaining addresses of memory accessing, which outputs retained addresses at a rate of two times per one pipeline cycle, a program counter for retaining prefetch addresses contained in a program to be executed, which outputs retained prefetch addresses at a rate of two times per one pipeline cycle, an instruction buffer for retaining a plurality of instructions prefetched from a memory which outputs a part or all of retained instructions at a rate of two times per pipeline cycle, an arithmetic/logic unit for executing an arithmetic or logic operation in a first half of one pipeline cycle and an addition operation in a latter half of one pipeline cycle, a first bus connected to said data register and said address register for transferring data to be written into and data read out from said data register or said address register, a second bus connected to said address register and said program counter for transferring contents of said address register and said program counter, a third bus connected to said data register and said instruction buffer for transferring contents of said data register and said instruction buffer, a first register connected to said arithmetic/logic unit for retaining results output from said arithmetic/logic unit, which outputs a result obtained in a first half of one pipeline cycle by said arithmetic/logic operation unit to said first bus in a latter half of said one pipeline cycle and a result obtained on a latter half of said one pipeline cycle by said arithmetic/logic unit to a bus control means in a first half of a following pipeline cycle, a second register connected to said first bus for retaining contents transferred through said first bus in a latter half of one pipeline cycle, and said bus control means for determining an operand address for accessing the memory by selecting one of said first and second registers, wherein said arithmetic/logic unit executes a calculation, in the first half of one pipeline cycle, using source data obtained by selecting either one of said second and third buses and destination data obtained by selecting said first bus and outputs results of said calculation to said first bus, and in the latter half of each pipeline cycle, executes an arithmetic calculation for calculating an operand address using a base address of the operand address obtained from contents of said second bus and an off-set of the operand address obtained from contents of said third bus and outputs the operand address to said first register, and wherein said bus control means selects contents of said first register if said arithmetic/logic unit calculates an operand address in the later half of each pipeline cycle, and otherwise selects the contents of said second register to access an operand.

2. The pipelined data processor according to claim 1 wherein said arithmetic/logic unit accesses contents of one of the addresses retained in said address register through said second bus and stores the accessed contents in said first register in the latter half of each pipeline cycle and said bus control means fetches an operand according to the contents stored in said first register in a pipeline cycle just after said one pipeline cycle.

3. The pipelined data processor according to claim 1 wherein said arithmetic/logic unit accesses contents of one of the addresses retained in said address register through said second bus and accesses a displacement included in an instruction stored in said instruction buffer through said third bus, adds said contents of the address retained in the address register and the displacement and stores the result obtained by the addition in said first register, and said bus control means fetches an operand according to the contents of said first register in a pipeline cycle just after said one pipeline cycle.

4. The pipelined data processor according to claim 1 wherein said arithmetic/logic unit accesses contents of one of the addresses retained in said address register through said second bus and accesses contents of one of the data retained in said data register through said third bus adds both contents accessed and stores the result obtained by addition in said first register, and said bus control means fetches an operand according to contents of said first register in a pipeline cycle just after said pipeline cycle.

5. The pipelined data processor according to claim 1 wherein said arithmetic/logic unit accesses contents of said program counter through said second bus and accesses a displacement included in an instruction stored in said instruction buffer through said third bus in the latter half of one pipeline cycle, and said bus control means fetches an instruction of a branch destination according to contents of said first register in a pipeline cycle just after said one pipeline cycle.

* * * * *